(12) United States Patent
Zhang

(10) Patent No.: US 12,513,231 B2
(45) Date of Patent: Dec. 30, 2025

(54) DISPLAY DEVICE INCLUDING CORNER FUNCTIONAL ELEMENT AND AUXILIARY DISPLAY MODULE

(71) Applicant: Wuhan China Star Optoelectronics Semiconductor Display Technology Co., Ltd., Hubei (CN)

(72) Inventor: Yunti Zhang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 506 days.

(21) Appl. No.: 17/623,895

(22) PCT Filed: Aug. 30, 2021

(86) PCT No.: PCT/CN2021/115215
§ 371 (c)(1),
(2) Date: Feb. 12, 2024

(87) PCT Pub. No.: WO2022/257277
PCT Pub. Date: Dec. 15, 2022

(65) Prior Publication Data
US 2024/0214479 A1    Jun. 27, 2024

(30) Foreign Application Priority Data
Jun. 10, 2021 (CN) .......................... 202110646634.4

(51) Int. Cl.
*G06F 1/16* (2006.01)
*H04M 1/02* (2006.01)
*H10K 59/65* (2023.01)
*H10K 102/00* (2023.01)

(52) U.S. Cl.
CPC ........ *H04M 1/0269* (2022.02); *G06F 1/1637* (2013.01); *H04M 1/0264* (2013.01); *H10K 59/65* (2023.02); *H10K 2102/311* (2023.02)

(58) Field of Classification Search
CPC .... G06F 1/1626; G06F 1/1656; G06F 1/1637; G06F 1/1658; G06F 1/1633; G06F 1/1643; G06F 1/1686; G06F 1/1698; G06F 1/16; G06F 1/1652; G06F 1/1647; G06F 1/1635; G06F 1/163; H05K 5/0217; H05K 5/03;
(Continued)

(56) References Cited

U.S. PATENT DOCUMENTS

| 8,421,763 B2* | 4/2013 | Liao ...................... H04M 1/185 345/173 |
| 9,907,193 B2* | 2/2018 | Lee ...................... H04M 1/0266 |
| 11,102,896 B1* | 8/2021 | Zhang ................... G09F 9/3026 |

(Continued)

FOREIGN PATENT DOCUMENTS

| CN | 107329203 | 11/2017 |
| CN | 208079138 | 11/2018 |

(Continued)

*Primary Examiner* — Abhishek M Rathod

(57) ABSTRACT

A display device includes a middle frame; a main display module being disposed on the middle frame and including a first curved display area and a second curved display area, wherein a junction of the first curved display area and the second curved display area is formed with a first opening; and a functional element disposed on the middle frame and in the first opening.

17 Claims, 8 Drawing Sheets

(58) Field of Classification Search
CPC ...... H05K 5/04; H05K 5/10; H05K 1/028; H05K 1/05; H05K 1/144; H05K 1/181
See application file for complete search history.

(56) References Cited

U.S. PATENT DOCUMENTS

| | | | | |
|---|---|---|---|---|
| 2010/0164152 | A1* | 7/2010 | Li | H04M 1/185 267/140.15 |
| 2014/0243053 | A1* | 8/2014 | Hynecek | A45C 11/00 455/575.8 |
| 2015/0331456 | A1* | 11/2015 | Moon | G06F 1/1656 361/679.55 |
| 2017/0355507 | A1* | 12/2017 | Rivellini | H01F 7/17 |
| 2018/0219987 | A1* | 8/2018 | Pantel | H10K 59/40 |
| 2019/0165825 | A1* | 5/2019 | Lin | G06F 1/1656 |
| 2024/0155916 | A1* | 5/2024 | Zhu | H10K 59/873 |

FOREIGN PATENT DOCUMENTS

| | | | | |
|---|---|---|---|---|
| CN | 210075395 | | 2/2020 | |
| CN | 111627330 | | 9/2020 | |
| CN | 111785738 | | 10/2020 | |
| CN | 112071198 | A * | 12/2020 | ............ G09F 9/301 |
| CN | 112420896 | | 2/2021 | |
| CN | 113140165 | | 7/2021 | |

* cited by examiner

DISPLAY DEVICE INCLUDING CORNER FUNCTIONAL ELEMENT AND AUXILIARY DISPLAY MODULE

RELATED APPLICATIONS

This application is a National Phase of PCT Patent Application No. PCT/CN2021/115215 having International filing date of Aug. 30, 2021, which claims the benefit of priority of Chinese Patent Application No. 202110646634.4 filed on Jun. 10, 2021. The contents of the above applications are all incorporated by reference as if fully set forth herein in their entirety.

FIELD AND BACKGROUND OF THE INVENTION

The present application relates to a technical field of a display, and more particularly to a display device.

With the change of people's aesthetic level and the development of the mobile terminal product, people gradually pursue mobile terminals having appearances with rounded curves, so that the dual-curved display technology has been developed. With the improvement of the dual-curved display technology, a quad-curved screen having the more beautiful arc, the differentiated appearance, and the higher screen-to-body ratio has also been derived.

In the quad-curved screen, however, four fillet areas are Gaussian 3D surface areas. The curved surface screen attached to the Gaussian 3D surface areas tends to have the wrinkling or bubbling phenomenon under forces in three directions. A known solution is to "cut off" the Gaussian surfaces in the quad-curved screen, so that no Gaussian surface is present. However, after the Gaussian surface has been cut off, the screen-to-body ratio of the quad-curved screen is reduced. In a top view, the four fillet areas show abnormal images, and the space availability of the quad-curved screen is significantly reduced.

SUMMARY OF THE INVENTION

In view of this, an objective of the present application is to provide a display device with the increased space availability.

Solution to Technical Problem

Technical Solutions

To achieve the above-identified objective, the present application provides a display device including: a middle frame; a main display module disposed on the middle frame, wherein the main display module includes a main display area and a curved display area, the curved display area is connected to a periphery of the main display area, the curved display area includes a first curved display area and a second curved display area, the first curved display area extends in a first direction, the second curved display area extends in a second direction intersecting the first direction, and a junction of the first curved display area and the second curved display area is formed with a first opening; and a functional element disposed on the middle frame and in the first opening.

In one embodiment, the functional element includes one of a camera, a button, a speaker and a sensor.

In one embodiment, the display device further includes an auxiliary display module, which corresponds to the first opening, is disposed on the middle frame, and covers the functional element.

In one embodiment, the functional element includes a functional part, and the auxiliary display module is formed with a through hole for exposing the functional part.

In one embodiment, the auxiliary display module is detachably or openably installed in the first opening.

In one embodiment, the functional element is collapsibly disposed in the first opening; the auxiliary display module detachably or openably covers the functional element; when the display device is in a first state, the auxiliary display module covers the functional element, and the functional element is in the first opening; and when the display device is in a second state, the auxiliary display module is away from the functional element, and the functional element extends out of the first opening.

In one embodiment, the curved display area further includes a third curved display area disposed opposite the first curved display area, and a fourth curved display area disposed opposite the second curved display area, the second curved display area and the fourth curved display area are respectively connected to and disposed between the first curved display area and the third curved display area, a junction of the first curved display area and the fourth curved display area is formed with a second opening, a junction of the second curved display area and the third curved display area is formed with a third opening, a junction of the third curved display area and the fourth curved display area is formed with a fourth opening, and the functional element is disposed in at least one of the second opening, the third opening and the fourth opening.

In one embodiment, an auxiliary display module is disposed in each of the first opening and the second opening, and the functional element is disposed in each of the third opening and the fourth opening.

In one embodiment, a volume control button is disposed in the first opening, a camera is disposed in the second opening, and a speaker is disposed in each of the third opening and the fourth opening.

In one embodiment, the auxiliary display module includes a substrate, a drive circuit layer and a light-emitting layer, the substrate includes a curved surface, the drive circuit layer is disposed on the curved surface, and the light-emitting layer is electrically connected to one side of the drive circuit layer away from the substrate.

In one embodiment, the drive circuit layer and the light-emitting layer have bending surfaces matching with the curved surface.

In one embodiment, the light-emitting layer is one of a light-emitting diode chip, a micro light-emitting diode chip, a sub-millimeter light-emitting diode and an organic light-emitting diode device.

In one embodiment, the auxiliary display module further includes a package layer and a curved cover plate, the package layer packages the light-emitting layer, and the curved cover plate covers one surface of the package layer away from the substrate.

In one embodiment, a range of the first opening covers an area between the first curved display area and the second curved display area and under bending stresses in three directions.

In one embodiment, the middle frame includes a bottom wall and sidewalls surrounding the bottom wall, and a junction of adjacent two of the sidewalls of the middle frame is formed with a fillet.

In one embodiment, a notch corresponding to the first opening is formed between adjacent two of the sidewalls of the middle frame, and the functional element is disposed in the first opening and the notch corresponding to the first opening.

In one embodiment, the auxiliary display module is a rigid display module.

In one embodiment, the main display module is a flexible display module.

Advantages of Invention

Useful Effect

The present application provides a display device. The display device includes a middle frame; a main display module being disposed on the middle frame and including a main display area and a curved display area, wherein the curved display area is connected to a periphery of the main display area, the curved display area includes a first curved display area and a second curved display area, the first curved display area extends in a first direction, the second curved display area extends in a second direction intersecting the first direction, and a junction of the first curved display area and the second curved display area is formed with a first opening; and a functional element disposed on the middle frame and in the first opening. In the display device of the present application, forming the first opening at the junction of the first curved display area and the second curved display area prevents the stress from being exerted onto the Gaussian surface and avoids wrinkles. Meanwhile, the space is sufficiently utilized by disposing the functional element in the first opening. Furthermore, forming the opening at the junction of adjacent two sub-curved display areas and disposing the auxiliary display module in the opening can increase the screen-to-body ratio of the display device, and implement the true full-screen display.

BRIEF DESCRIPTION OF THE SEVERAL VIEWS OF THE DRAWINGS

In order to explain the technical solution in the present application more clearly, the drawings required for the description of the embodiments will be briefly introduced. Obviously, the drawings in the following description only relate to some embodiments of the present application. Other drawings can be obtained from these drawings without creative works for those skilled in the art.

DESCRIPTION OF SPECIFIC EMBODIMENTS OF THE INVENTION

In order to make purposes, technical solutions, and effects of the present application clearer and more specific, the present application is further described in detail below with reference to the accompanying drawings and examples. It should be understood that the specific embodiments described herein are only used to explain the present application, and are not used to limit the present application.

It can be understood that those having ordinary skills of the art may easily contemplate various changes and modifications of the technical solution and technical ideas of the present application and all these changes and modifications are considered within the protection scope of right for the present application.

The present application provides a display device including a middle frame, a main display module and a functional element. The main display module disposed on the middle frame includes a main display area and a curved display area. The curved display area connected to a periphery of the main display area includes a first curved display area and a second curved display area. The first curved display area extends in a first direction. The second curved display area extends in a second direction intersecting the first direction. A junction of the first curved display area and the second curved display area is formed with a first opening. The functional element is disposed on the middle frame and in the first opening.

In the display device of the present application, forming the first opening at the junction of the first curved display area and the second curved display area prevents the stress from being exerted onto the Gaussian surface and avoids wrinkles. Meanwhile, the space is sufficiently utilized by disposing the functional element in the first opening. In addition, the main display module and the functional element are disposed on the middle frame and are supported by the middle frame. Compared with the prior art of disposing the functional element on the border, the effect of narrowing the border can be achieved.

In the following, a structure of a display device provided by an embodiment of the present application will be described with reference to the accompanying drawings.

A display device 100 provided by the embodiment of the present application may be one of a mobile phone, a tablet computer, a notebook, a playstation, a wearable apparatus and the like.

Figure 1:
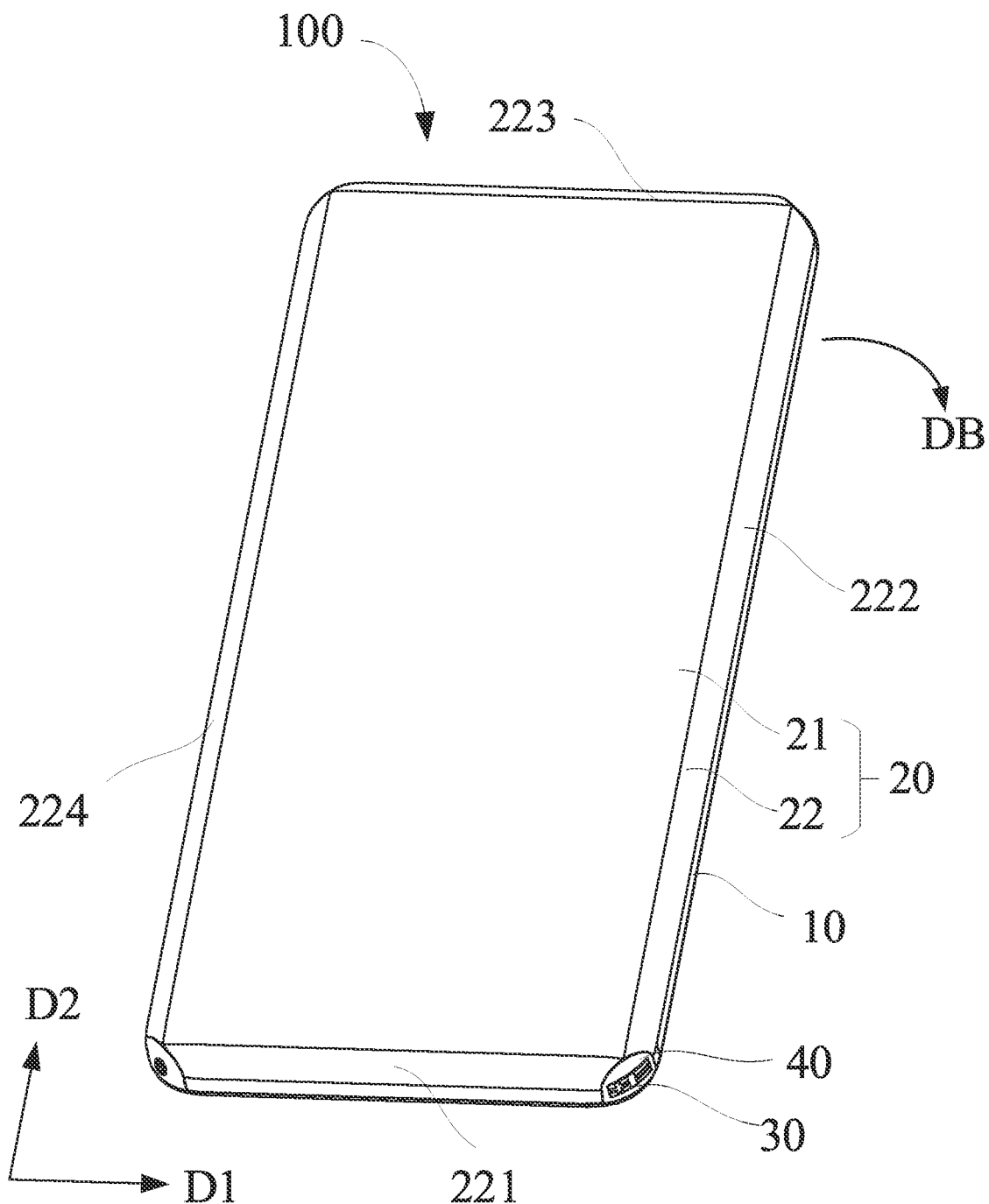
FIG. 1 is a pictorial view showing a display device provided by an embodiment of the present application.
Figure 2:
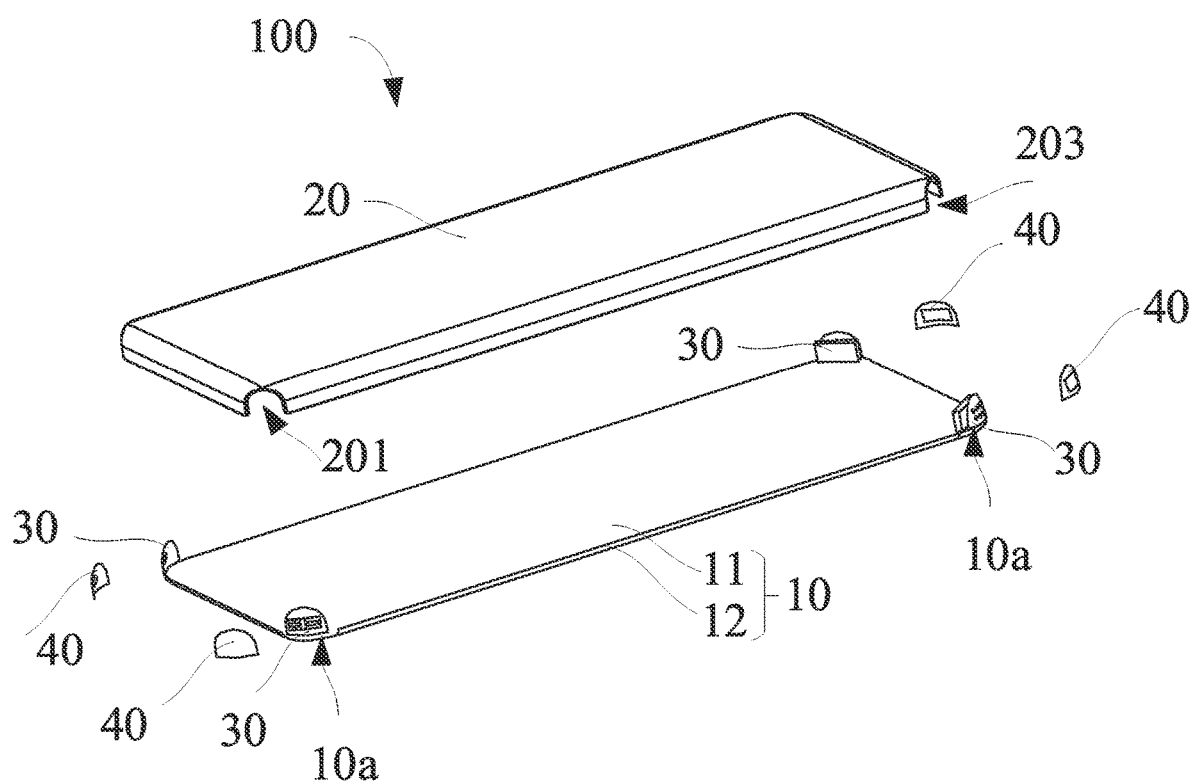
FIG. 2 is an exploded view showing the display device of FIG. 1.

FIG. 1 is a pictorial view showing a display device provided by an embodiment of the present application. FIG. 2 is an exploded view showing the display device of FIG. 1. Referring to FIGS. 1 and 2, the display device 100 includes a middle frame 10, a main display module 20 and one or multiple functional elements 30. The main display module 20 and the functional elements 30 are disposed on the middle frame 10.

The display device 100 usually includes a front housing (not shown), a back cover (not shown) and the middle frame 10 disposed between the front housing and the back cover. The middle frame 10 may be provided with a button, or formed with a speaker hole, and the like.

In this embodiment, a top view of the middle frame 10 has a rounded rectangular shape. The middle frame 10 includes a bottom wall 11 and sidewalls 12 surrounding the bottom wall 11. The bottom wall 11 and the sidewalls 12 form a chamber for accommodating components of the display device 100. A junction of adjacent two sidewalls 12 of the middle frame 10 of the main display module 20 is formed with a fillet. A notch 10*a* is formed between adjacent two of the sidewalls 12 at four fillets of the middle frame 10. The functional elements 30 are disposed in the notches 10*a*. The middle frame 10 may be made of a metal material.

The main display module 20 covers the middle frame 10. The main display module 20 may cover a portion of the sidewalls 12 of the middle frame 10. The main display module 20 is a flexible display module. The main display module 20 may be an active light-emitting display module, such as an organic light-emitting diode (OLED) display module, an active matrix organic light-emitting diode (AMOLED) display module, a passive matrix organic light-emitting diode (PMOLED) display module, a quantum dot organic light-emitting diode (QLED) display module, a micro light-emitting diode (Micro-LED) display module or a mini light-emitting diode (Mini-LED) display module.

The main display module 20 includes a main display area 21 and a curved display area 22. The main display area 21 is disposed above the bottom wall 11 of the middle frame 10. The curved display area 22 of the main display module 20 is attached to the sidewalls 12 of the middle frame 10, and connected to and disposed between the main display area 21 and the middle frame 10. The curved display area 22 is connected to a periphery of the main display area 21. The curved display area 22 includes two sub-curved display areas. The main display module 20 may have four sub-curved display areas. That is, the main display module 20 may be a quad-curved display screen. The main display module 20 may also have more than four sub-curved display areas. In this embodiment, the main display area 21 may be rectangular. It will be appreciated that in other embodiments of the present application, the main display area 21 may also have a rounded rectangular shape, a triangular shape, a circular shape, a polygonal shape and the like. The curved display area 22 includes a first curved display area 221, a second curved display area 222, a third curved display area 223 and a fourth curved display area 224. The first curved display area 221 and the third curved display area 223 extend in a first direction D1. The second curved display area 222 and the fourth curved display area 224 extend in a second direction D2 intersecting the first direction D1. Specifically, the first direction D1 is perpendicular to the second direction D2 in this embodiment. The third curved display area 223 is disposed opposite the first curved display area 221. The fourth curved display area 224 is disposed opposite the second curved display area 222. The second curved display area 222 and the fourth curved display area 224 are respectively connected to and disposed between the first curved display area 221 and the third curved display area 223.

The present application does not restrict positions of the first curved display area 221, the second curved display area 222, the third curved display area 223 and the fourth curved display area 224. In this embodiment, the first curved display area 221 is disposed on a bottom side of the display device 100, the third curved display area 223 is disposed on a top side of the display device 100, the second curved display area 222 is disposed on a right side of the display device 100, and the fourth curved display area 224 is disposed on a left side of the display device 100.

Each of the first curved display area 221, the second curved display area 222, the third curved display area 223 and the fourth curved display area 224 is bent about a bending axis DB perpendicular to an extending direction thereof in a direction from a location near the main display area 21 to a location away from the main display area 21. For example, the second curved display area 222 is bent about the bending axis DB perpendicular to the extending direction thereof of the second curved display area 222 in the direction from the location near the main display area 21 to the location away from the main display area 21.

Figure 3:
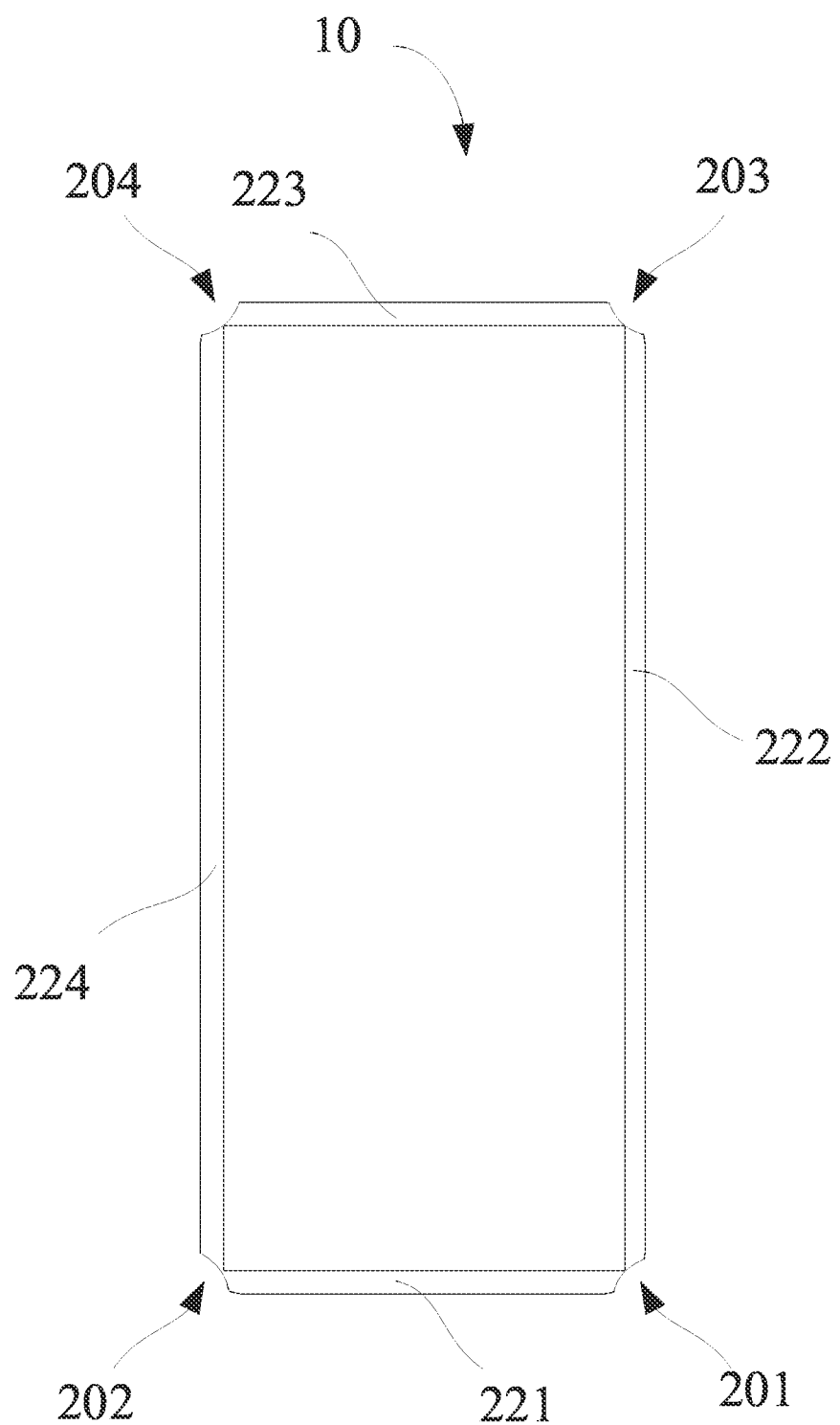
FIG. 3 is a schematic top view showing a main display module of FIG. 1.

FIG. 3 is a schematic top view showing a main display module of FIG. 1. Referring to FIG. 3, the junction of the first curved display area 221 and the second curved display area 222 is formed with a first opening 201. The junction of the first curved display area 221 and the fourth curved display area 224 is formed with a second opening 202. The junction of the second curved display area 222 and the third curved display area 223 is formed with a third opening 203. The junction of the third curved display area 223 and the fourth curved display area 224 is formed with a fourth opening 204. Each opening is formed at a location corresponding to the notch 10*a* formed on the middle frame 10. When a flexible display panel is used to form the main display area 21, the first curved display area 221 and the second curved display area 222, the flexible display panel is bent in three directions at the junction of the first curved display area 221 and the second curved display area 222, so that bending stresses in three directions are exerted onto the flexible display panel. Under the bending stresses in three directions, each film layer of the flexible display panel tends to generate the wrinkling or bubbling phenomenon and affect the display effect. Thus, the first opening 201 is formed at the junction of the first curved display area 221 and the second curved display area 222 to prevent wrinkles from being formed and prevent the display effect from being affected. The present application does not restrict the dimension of the opening as long as the range of the first opening 201 covers an area under the bending stresses in three directions. In this embodiment, the range of the first opening 201 just covers an area under the bending stresses in three directions. In other embodiments, the first opening 201 may also cover a larger or smaller range. For example, the range of the first opening 201 covers a partial area under the bending stresses in three directions, and further covers another area beside the area under the bending stresses in three directions. It will be appreciated that in the display device 100 of another embodiment, there may be more than three junctions of the sub-curved display areas under bending stresses in more than three directions. In order to prevent the wrinkles from being formed at these locations, openings may also be formed at more than three junctions of the sub-curved display areas. In addition, the positions and dimensions of the second opening 202, the third opening 203 and the fourth opening 204 are similar to those of the first opening 201, and detailed descriptions thereof will be omitted here.

Referring again to FIG. 2, the functional element 30 is disposed on the middle frame 10. The functional element 30 may be mounted on the middle frame 10 by way of welding or soldering, and may also be detachably mounted on the middle frame 10 by other connection methods, such as snapping. In addition, the functional element 30 is located in the first opening 201 and the notch 10*a* corresponding to the first opening 201. Thus, the space is sufficiently utilized.

Figure 4A:
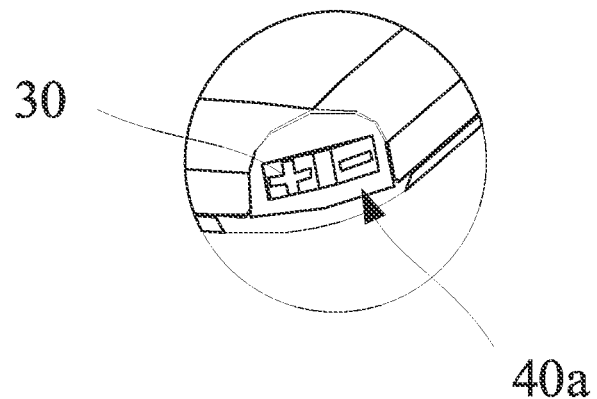
FIG. 4(a) is a schematic enlarged view showing a functional element in a first opening.
Figure 4B:
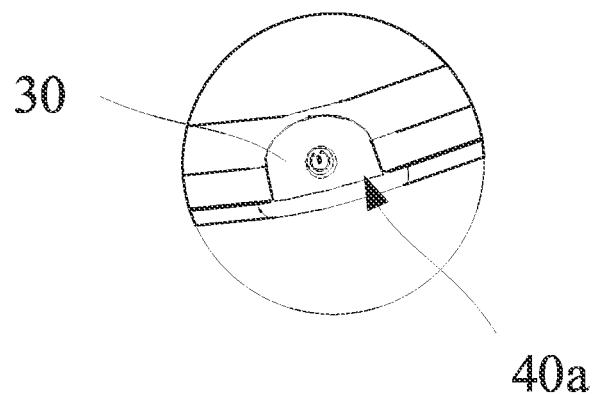
FIG. 4(b) is a schematic view showing a functional element in a second opening.
Figure 4C:
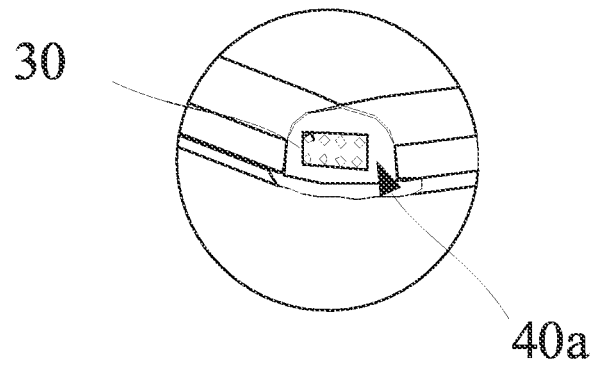
FIG. 4(c) is a schematic view showing a functional element in a third opening.

In this embodiment, one functional element 30 is disposed in each of the first opening 201, the second opening 202, the third opening 203 and the fourth opening 204. FIG. 4(*a*) is a schematic enlarged view showing the functional element in the first opening; FIG. 4(*b*) is a schematic view showing the functional element in the second opening; and FIG. 4(*c*)

is a schematic view showing the functional element in the third opening. Referring to FIGS. 4(a) to 4(c), the functional element 30 in the fourth opening 204 is the same as that in the third opening 203 in this embodiment, so the schematic view thereof is omitted. Specifically, a volume control button is disposed in the first opening 201, a camera is disposed in the second opening 202, and speakers are disposed in the third opening 203 and the fourth opening 204. Two speakers are respectively disposed on left and right sides of a location above the display device 100 to obtain the better sound amplifying effect.

In other embodiments of the present application, the functional elements 30 are disposed in only a portion of the openings. Specifically, the functional elements 30 are disposed in the third opening 203 and the fourth opening 204 in one embodiment.

The functional elements 30 include one or multiple ones of a camera, a button, a speaker and a sensor. The button may be a volume button, a power button or a direction control button used in a game. The sensor may be one of a fingerprint recognition sensor, a light sensor, a distance sensor and the like.

In one embodiment, the functional element 30 includes a functional part through which the functional element 30 interacts with the outside environment, receives or transmits signals to provide its function. For example, the functional part may be one of a light collecting part of the camera, a physical pressing part of the button, a speaker hole of the speaker, a signal collecting part of the sensor and the like. The functional part of the functional element 30 is for receiving or collecting an external signal, and is thus exposed to the user in the used state.

Figure 5:
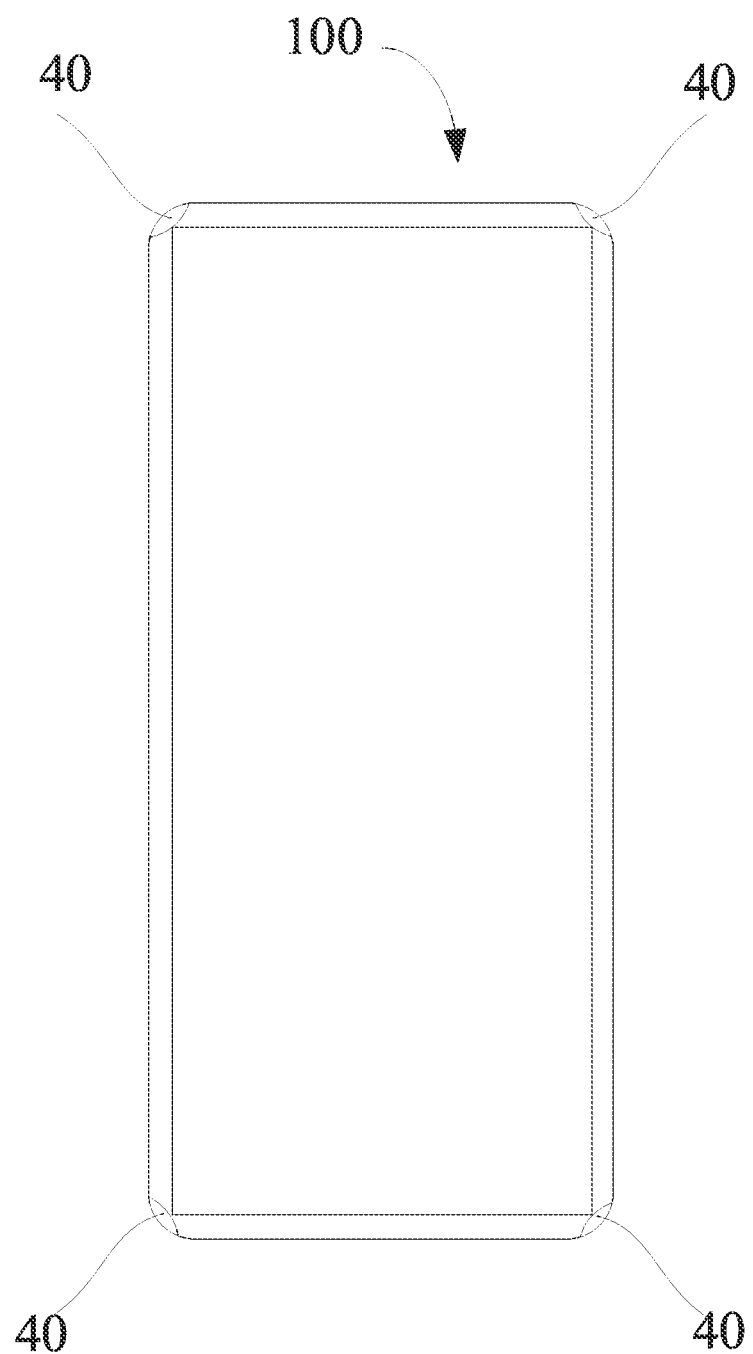
FIG. 5 is a schematic top view showing the display device of FIG. 1.

FIG. 5 is a schematic top view showing the display device of FIG. 1. Referring to FIGS. 2, 3 and 5 concurrently, the display device 100 in this embodiment further includes an auxiliary display module 40 disposed on the middle frame 10. The auxiliary display module 40 may also be mounted onto the middle frame 10, and may also be detachably disposed on the middle frame 10. The main display module 20 matches with the auxiliary display module 40 to constitute an integral quad-curved display screen, and a display screen of the display device 100. In another embodiment, the main display module 20 and the auxiliary display module 40 are spliced together. The main display module 20 is connected to the auxiliary display module 40 through a connector. The main display module 20 and the auxiliary display module 40 may also be connected to and driven by different driver chips, or may also be connected to and driven by the same driver chip.

Specifically, the auxiliary display module 40 is disposed in at least one of the first opening 201, the second opening 202, the third opening 203 and the fourth opening 204. In this embodiment, the auxiliary display module 40 is disposed in each of the first opening 201, the second opening 202, the third opening 203 and the fourth opening 204.

It will be appreciated that in some embodiments, the curved display area 22 includes more than four sub-curved display areas. In these embodiments, the opening is disposed between adjacent two of the sub-curved display areas, and the auxiliary display module 40 is disposed in at least one of the openings.

In this embodiment, forming the opening at the junction of adjacent two sub-curved display areas and disposing the auxiliary display module 40 in the opening can increase the screen-to-body ratio of the display device 100, and implement the true full-screen display.

The auxiliary display module 40 and the main display module 20 may be independent from each other to perform the respective displaying operations. In one embodiment, the main display module 20 may display a user interface or an image, while the auxiliary display module 40 independently displays the information, such as the weather, time, battery level and the like. When the main display module 20 is turned on to display the user interface or image, the auxiliary display module 40 displays the information, such as the weather, time, battery level and the like. When the main display module 20 is turned off, the auxiliary display module 40 still displays the information, such as the weather, time, battery level and the like.

The auxiliary display module 40 and the main display module 20 may commonly display a frame. In another embodiment, when the main display module 20 is turned on to display the user interface or image, the auxiliary display module 40 and the main display module 20 commonly display a full frame. When the main display module 20 is turned off, the auxiliary display module 40 is also turned off. When the display device 100 receives a wake-up command of the auxiliary display module 40, the auxiliary display module 40 independently displays information, such as the weather, time and the like.

In one embodiment, the auxiliary display module 40 is detachably installed in the first opening 201. By configuring the auxiliary display module 40 to be detachable, the auxiliary display module 40 may be easily replaced when the auxiliary display module 40 fails. The auxiliary display module 40 may be fixed to the middle frame 10 by way of snapping, buckling, magnet attracting or screwing. In one embodiment, mounting slots surrounding the first opening 201 may be formed on the middle frame 10 of the display device 100, and mounting blocks to be snapped into the mounting slots are disposed on the detachable auxiliary display module 40.

In one embodiment, the auxiliary display module 40 is openably installed in the first opening 201. Configuring the auxiliary display module 40 to be openable allows other elements to be hidden under the auxiliary display module 40. The auxiliary display module 40 may be fixed to the middle frame 10 by way of snapping, buckling, magnet attracting or screwing. In one embodiment, the openable auxiliary display module 40 has one end fixed to and connected to the middle frame 10, and the other end detachable connected thereto.

The auxiliary display module 40 may be a rigid display module. That is, the auxiliary display module 40 has a predetermined fixed shape, and cannot be bent or folded. The auxiliary display module 40 may be an active light-emitting display module, such as one of the OLED display module, the AMOLED display module, the PMOLED display module, the QLED display module, the micro-LED display module and the mini-LED display module.

Figure 6:
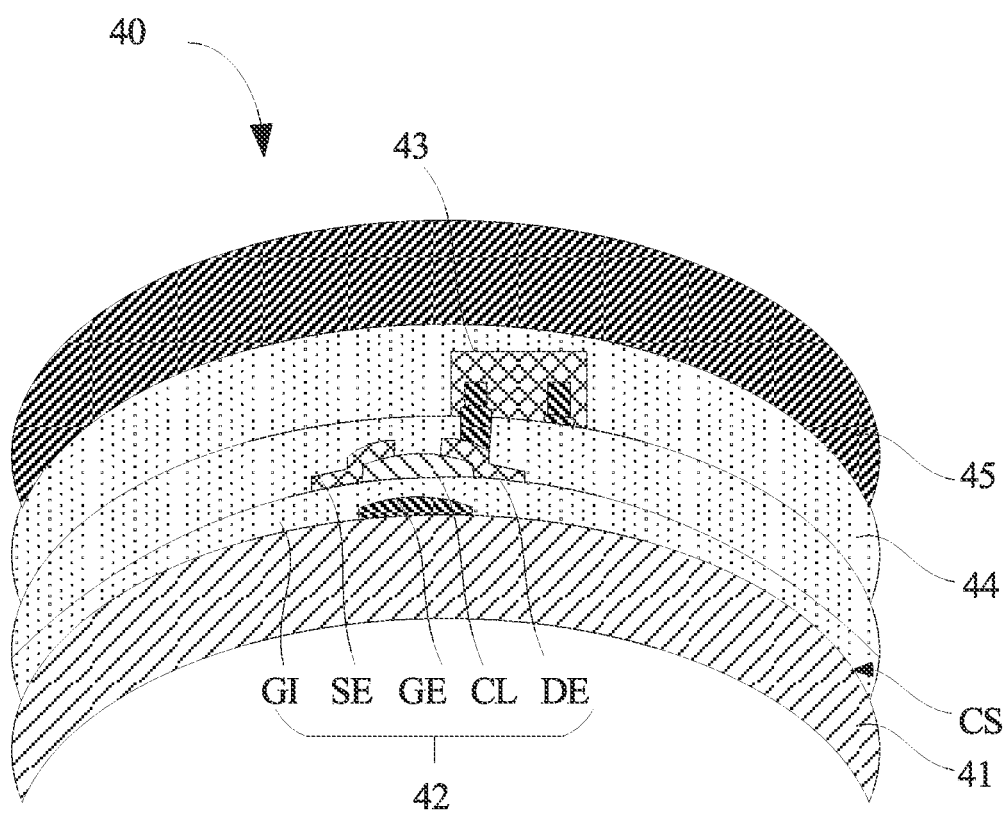
FIG. 6 is a schematic cross-sectional view showing an auxiliary display module.

FIG. 6 is a schematic cross-sectional view showing an auxiliary display module. Referring to FIG. 6, the auxiliary display module 40 includes a substrate 41, a drive circuit layer 42 and a light-emitting layer 43. The substrate 41 includes a curved surface CS. The drive circuit layer 42 is disposed on the curved surface CS. The light-emitting layer 43 is electrically connected to one side of the drive circuit layer 42 away from the substrate 41. The drive circuit layer 42 and the light-emitting layer 43 have bending surfaces matching with the curved surface CS.

Specifically, the substrate 41 may be made of a glass or plastic material. In one embodiment, a curved glass member is formed by processing techniques such as thermal glass bending and polishing. In another embodiment, a curved plastic member is formed by way of injection molding. The shapes of other surfaces of the substrate 41 are not restricted, and may be a curved shape and a flat shape.

The drive circuit layer 42 includes a drive circuit of the light-emitting elements. The drive circuit includes thin film transistors (TFTs). Specifically, the TFT in this embodiment is a bottom-gate type TFT. The TFT includes a gate GE, a gate insulating layer GI, an active layer CL, a source SE and a drain DE successively stacked together. Specifically, the gate GE is disposed on the curved surface. The gate insulating layer GI covers the gate GE and the substrate 41. The active layer CL is disposed on one surface of the gate insulating layer GI away from the substrate 41. The active layer CL is disposed opposite the gate GE. The source SE and the drain DE are disposed on one surface of the active layer CL away from the gate GE, and are respectively connected to two ends of the active layer CL. The drive circuit layer 42 is formed on the curved surface by way of exposure, development and etching to form the drive circuit.

The light-emitting layer 43 includes a light-emitting element. The light-emitting element is one of a LED chip, a micro-LED chip, a sub-millimeter LED and an OLED device. In this embodiment, the LED is the micro-LED chip. The light-emitting layer 43 is formed using the mass transfer technology to bind the light-emitting element to the drive circuit layer 42.

In addition, the auxiliary display module 40 further includes a package layer 44 and a curved cover plate 45. The package layer 44 packages the light-emitting layer 43. The curved cover plate 45 covers one surface of the package layer 44 away from the substrate 41.

Because the substrate 41 has the curved surface, when the drive circuit layer 42 and the light-emitting layer 43 are formed on the curved surface, the drive circuit layer 42 and the light-emitting layer 43 form the curved surface shape matching with the curved surface according to the shape of the curved surface. When the auxiliary display module 40 and the main display module 20 are assembled with the middle frame 10 to form the display device 100, no bending is required, thereby preventing wrinkles from being formed.

Referring again to FIGS. 4(a) to 4(c), the auxiliary display module 40 in this embodiment is formed with a through hole 40a for exposing the functional part of the functional element 30. By forming the through hole 40a in the auxiliary display module 40 to expose the functional part of the functional element 30, the space utilization at four corners of the display device 100 can be implemented without affecting the display effect. The dimension of the through hole 40a in the present application may be configured according to the display requirement, so that the screen presented in the user's field of view is a complete full screen when the user is in front of the screen, and the functional element 30 is covered or occluded by the auxiliary display module 40.

Figure 7:
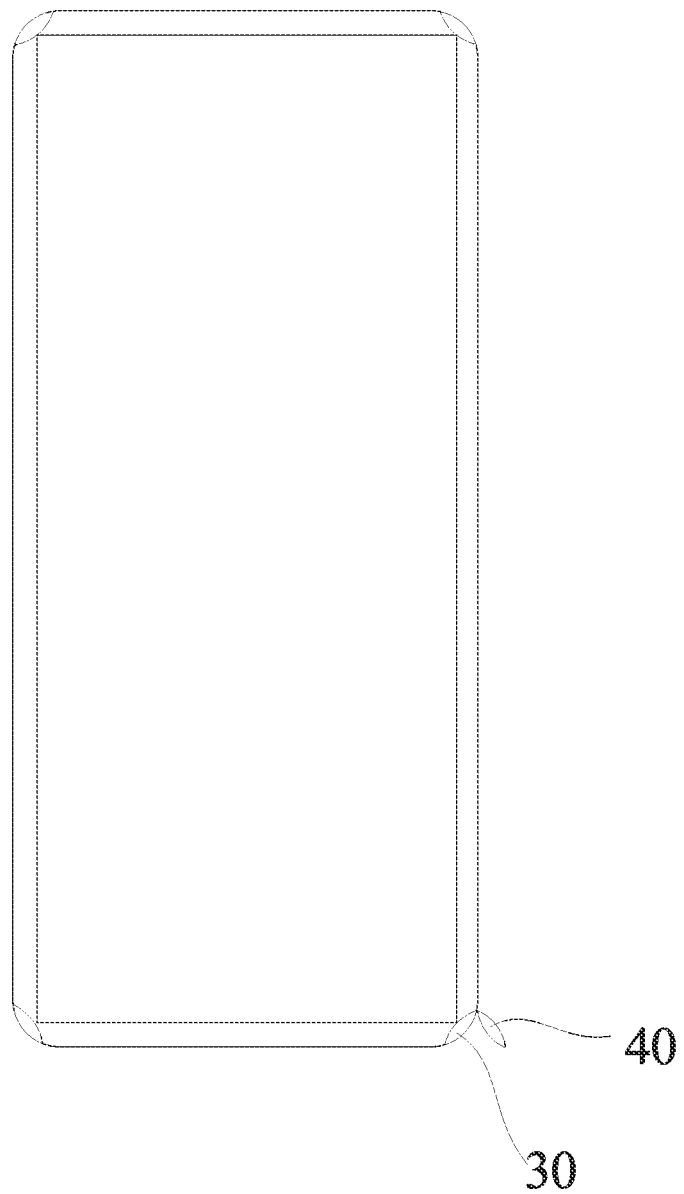
FIG. 7 is a schematic view showing the display device of the embodiment of the present application in a second state.

In one embodiment, the auxiliary display module 40 is detachably or openably installed in the first opening 201. The auxiliary display module 40 covers the functional element 30. The auxiliary display module 40 can be used to protect the functional element 30, and facilitates the maintenance when the functional element 30 fails. The display device 100 has a first state and a second state. In the first state, displaying of the auxiliary display module 40 may be enabled or disabled, and the functional element 30 is occluded by the auxiliary display module 40. In the second state, displaying of the auxiliary display module 40 may be enabled or disabled, and the functional element 30 is exposed from the underside of the auxiliary display module 40. Referring to FIG. 5, when the display device 100 is in the first state, the functional element 30 is disposed in the first opening 201, and the auxiliary display module 40 covers the functional element 30. FIG. 7 is a schematic view showing the display device of the embodiment of the present application in the second state. Referring to FIG. 7, when the display device 100 is in the second state and the auxiliary display module 40 is in the opened state, the functional element 30 is exposed from the first opening 201.

Figure 8:
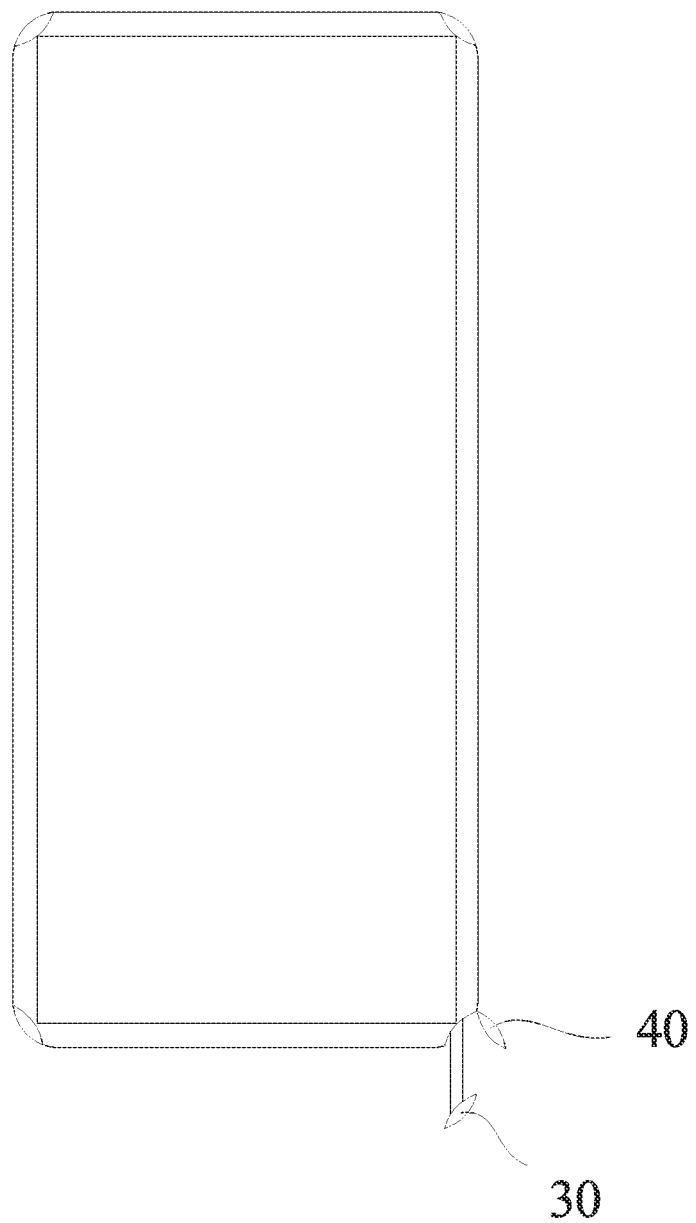
FIG. 8 is a schematic view showing the display device of the embodiment of the present application in a third state.

In another embodiment, the functional element 30 is collapsibly disposed in the first opening 201, and the auxiliary display module 40 detachably or openably covers the functional element 30. Referring to FIG. 5, when the display device 100 is in the first state, the functional element 30 is disposed in the first opening 201, and the auxiliary display module 40 covers the functional element 30. The display device 100 further has a third state. In the third state, the functional element 30 may extend out of the first opening 201 to execute its function. FIG. 8 is a schematic view showing the display device of the embodiment of the present application in the third state. Referring to FIG. 8, when the display device 100 is in the third state and the auxiliary display module 40 is in the opened state, the functional element 30 extends out of the first opening 201. For example, when the functional element 30 is the camera, the camera may extend out of the first opening 201 to take a shot in the third state.

In addition, one auxiliary display module 40 is disposed in each of the first opening 201, the second opening 202, the third opening 203 and the fourth opening 204 in this embodiment, and the functional element 30 is disposed under each of the auxiliary display modules 40.

In other embodiments of the present application, the auxiliary display module or modules 40 are disposed in one portion of the openings, and the functional element or elements 30 are disposed in the other portions of the openings. Specifically, the auxiliary display module 40 in the first opening 201 and the second opening 202, and the functional elements 30 are disposed in the third opening 203 and the fourth opening 204 in one embodiment. The auxiliary display modules 40 in the first opening 201 and the second opening 202 are correspondingly disposed on left and right sides of the display device 100, and the functional elements 30 in the third opening 203 and the fourth opening 204 are also correspondingly disposed on left and right sides of the display device 100, wherein the symmetrical design further facilitates the user's operations.

In some other embodiments of the present application, the functional element 30 is disposed in each of the first opening 201, the second opening 202, the third opening 203 and the fourth opening 204, and the auxiliary display module 40 does not cover the functional element 30.

The present application provides a display device. The display device includes a middle frame; a main display module being disposed on the middle frame and including a main display area and a curved display area, wherein the curved display area is connected to a periphery of the main display area, the curved display area includes a first curved display area and a second curved display area, the first curved display area extends in a first direction, the second curved display area extends in a second direction intersecting the first direction, and a junction of the first curved display area and the second curved display area is formed with a first opening; and a functional element disposed on the middle frame and in the first opening. In the display device of the present application, forming the first opening at the junction of the first curved display area and the second curved display area prevents the stress from being exerted onto the Gaussian surface and avoids the wrinkles. Meanwhile, the space is sufficiently utilized by disposing the functional element in the first opening.

The embodiments of the present application have been described in detail hereinabove, wherein specific examples are used to explain the principles and embodiments of the present application to make the present application be easily understood. Meanwhile, those skilled in the art may easily make changes to the specific embodiments and the application range according to the idea of the present application. In summary, the contents of this specification should not be construed as limitations to the present application.

What is claimed is:

1. A display device, comprising:
   a middle frame;
   a main display module disposed on the middle frame, wherein the main display module comprises a main display area and a curved display area, the curved display area is connected to a periphery of the main display area, the curved display area comprises a first curved display area and a second curved display area, the first curved display area extends in a first direction, the second curved display area extends in a second direction intersecting the first direction, and a junction of the first curved display area and the second curved display area is formed with a first opening;
   a functional element disposed on the middle frame and in the first opening; and
   an auxiliary display module, which is disposed in the first opening and on the middle frame, and detachably covers the functional element;
   wherein the auxiliary display module comprises a substrate, a drive circuit layer and a light-emitting layer.

2. The display device according to claim 1, wherein the functional element comprises one of a camera, a button, a speaker and a sensor.

3. The display device according to claim 1, wherein the functional element comprises a functional part, and the auxiliary display module is formed with a through hole for exposing the functional part.

4. The display device according to claim 1, wherein the auxiliary display module is openably installed in the first opening.

5. The display device according to claim 1, wherein: the functional element is collapsibly disposed in the first opening; the auxiliary display module detachably or openably covers the functional element;
   when the display device is in a first state, the auxiliary display module covers the functional element, and the functional element is in the first opening; and when the display device is in a second state, the auxiliary display module is away from the functional element, and the functional element extends out of the first opening.

6. The display device according to claim 1, wherein the curved display area further comprises a third curved display area disposed opposite the first curved display area, and a fourth curved display area disposed opposite the second curved display area, wherein the second curved display area and the fourth curved display area are respectively connected to and disposed between the first curved display area and the third curved display area, a junction of the first curved display area and the fourth curved display area is formed with a second opening, a junction of the second curved display area and the third curved display area is formed with a third opening, a junction of the third curved display area and the fourth curved display area is formed with a fourth opening, and the functional element is disposed in at least one of the second opening, the third opening and the fourth opening.

7. The display device according to claim 6, wherein an auxiliary display module is disposed in each of the first opening and the second opening, and the functional element and another functional element are disposed in the third opening and the fourth opening, respectively.

8. The display device according to claim 7, wherein a volume control button is disposed in the first opening, a camera is disposed in the second opening, and a speaker is disposed in each of the third opening and the fourth opening.

9. The display device according to claim 1, wherein the substrate comprises a curved surface, the drive circuit layer is disposed on the curved surface, and the light-emitting layer is electrically connected to one side of the drive circuit layer away from the substrate.

10. The display device according to claim 9, wherein the drive circuit layer and the light-emitting layer have bending surfaces matching with the curved surface.

11. The display device according to claim 9, wherein the light-emitting layer is one of a light-emitting diode chip, a micro light-emitting diode chip, a sub-millimeter light-emitting diode and an organic light-emitting diode device.

12. The display device according to claim 9, wherein the auxiliary display module further comprises a package layer and a curved cover plate, the package layer packages the light-emitting layer, and the curved cover plate covers one surface of the package layer away from the substrate.

13. The display device according to claim 1, wherein a range of the first opening covers an area between the first curved display area and the second curved display area and under bending stresses in three directions.

14. The display device according to claim 1, wherein the middle frame comprises a bottom wall and sidewalls surrounding the bottom wall, and a junction of adjacent two of the sidewalls of the middle frame is formed with a fillet.

15. The display device according to claim 14, wherein a notch corresponding to the first opening is formed between adjacent two of the sidewalls of the middle frame, and the functional element is disposed in the first opening and the notch corresponding to the first opening.

16. The display device according to claim 1, wherein the auxiliary display module is a rigid display module.

17. The display device according to claim 1, wherein the main display module is a flexible display module.

* * * * *